United States Patent [19]

Sigmon

[11] Patent Number: 5,163,656
[45] Date of Patent: Nov. 17, 1992

[54] VANELESS ROTARY AIRLOCK VALVE

[76] Inventor: James W. Sigmon, 2415 Knollwood Rd., Charlotte, N.C. 28211

[21] Appl. No.: 640,605

[22] Filed: Jan. 14, 1991

[51] Int. Cl.⁵ .............................................. F16K 5/00
[52] U.S. Cl. ................................... 251/314; 251/144; 222/452
[58] Field of Search ............... 251/144, 145, 304, 309, 251/314, 359, 368; 131/874; 222/368, 452

[56] References Cited

U.S. PATENT DOCUMENTS

| | | | |
|---|---|---|---|
| 2,628,809 | 2/1953 | Mikeska | 251/359 X |
| 4,137,935 | 2/1979 | Snowdon | 251/144 X |
| 4,782,741 | 11/1988 | Sigmon | 222/452 X |

Primary Examiner—John C. Fox

[57] ABSTRACT

A vaneless air lock valve including a housing, a hollow rotor having an opening in its cylindrical outer surface, and first and second opposed valve seats each including spherical inner and outer surfaces. A sealing surface extends between the inner and the outer surface. The rotor is supported in the housing to rotate about its major axis, with the valve seats supported by the housing such that the sealing surfaces of the valve seats engage said rotor. In first and second rotary positions the opening is symmetrically positioned with respect to the sealing surfaces of the first and second seats with the inner perimeter of the valve seats substantially coinciding with the opening in the rotor.

7 Claims, 5 Drawing Sheets

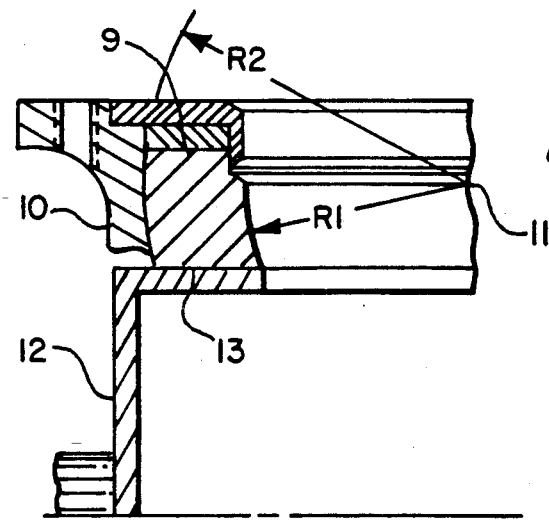
Fig. 10
Fig. 11
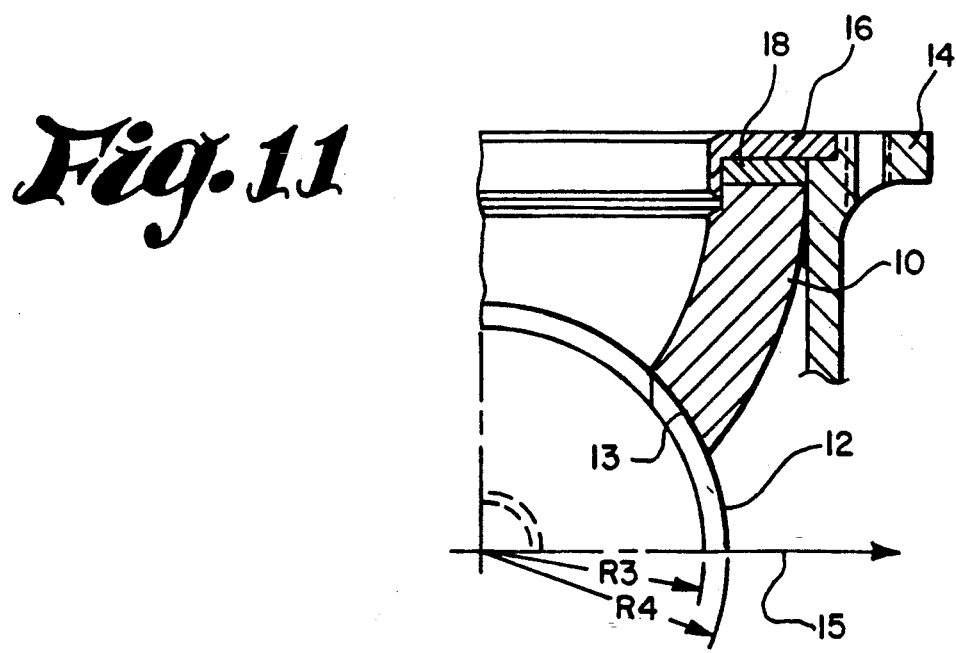

VANELESS ROTARY AIRLOCK VALVE

BACKGROUND OF THE INVENTION

The invention relates to vaneless rotary airlock valves and more particularly to vaneless rotary airlock valves using an improved rotor and improved valve seats.

DISCUSSION OF THE PRIOR ART

Vaneless rotary airlock valves have been available in the prior art for a number of years. In all known prior art vaneless airlock valves, a considerable change in torque was experienced as the angle of the rotor changed. Additionally, with use uneven wear of the rotor and valve seats was common. From a theoretical standpoint, these characteristics are not well understood. However, they are believed to be related to uneven loading of the seating surface and possibly to flexing of the valve seats.

The improved valve design which is the subject matter of this patent application substantially reduces changes in torque as the rotor rotates. Additionally, uneven wear of the valve seat and the rotor is significantly reduced. These improvements have been achieved without any significant increase in cost of the vaneless rotary airlock valve.

REFERENCE TO PRIOR U.S. PATENT APPLICATION

The vaneless rotary airlock valve which is the subject matter of this patent application is a modification of the vaneless rotary airlock valve disclosed in copending U.S. patent application Ser. No. 07/509,633.

SUMMARY OF THE INVENTION

The invention provides an improved rotary vaneless airlock valve. The preferred embodiment of the invention utilizes an improved valve seat and an improved rotor which interact synergistically to reduce changes in torque and reduce valve seat and rotor wear.

More specifically, the improved vaneless airlock valve includes a valve seat having: an inner surface comprising a portion of a sphere (spherical surface); an outer surface also comprising a portion of a sphere (spherical surface) concentric with the inner surface; and a sealing surface symmetric about the major axis of the valve seat. The sealing surface is adapted to mate with the outer surface of a rotor and includes curved inner and outer perimeters with the sealing surface also extending between the inner and outer spherical surfaces of the valve seat. The inner and outer perimeters of the seating surface and the valve seat have a major axis extending through the opening in the valve seat such that the inner and outer perimeters of the sealing surface are symmetric with respect to this axis. The opening in the rotor also has a major axis extending therethrough, such that the inner perimeter of the opening in the rotor is symmetric with respect to this axis. Additionally, for rotor positions which result in the major axis of the valve seat and the major axis of the rotor opening coinciding, the inner perimeter of the valve seat and the perimeter of the opening in the rotor similarly coincide. Housing means support the rotor and at least two substantially identical seats, with the sealing surfaces of the seats mating with the rotor at opposed positions.

An alternate embodiment of the invention provides a valve seat which includes a valve seat insert composed of at least an inner and outer layer with the inner layer being selected to form an effective seal with the surface of the rotor while the outer layer is selected to provide resiliency in the valve seat to aid in loading of the valve seat against the rotor and to compensate for thermal expansion.

DESCRIPTION OF THE DRAWINGS

FIG. 10 is a crossection view of one quarter of the vaneless air lock valve along the major axis of the rotor.

FIG. 11 is a crossection drawing of one quarter of the vaneless airlock valve along a line perpendicular to the axis of rotation of the rotor.

DETAILED DESCRIPTION

Figure 1:
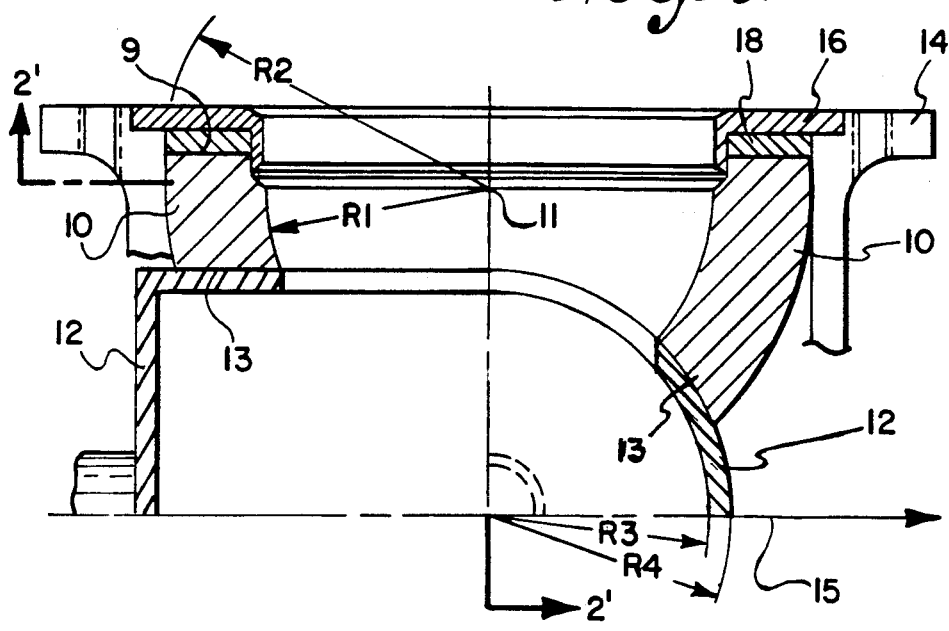
FIG. 1 is a composite drawing of the vaneless rotary air lock valve illustrating the valve seat with respect to the rotor in first and second planes, respectively parallel to and transverse to the axis of rotation of the rotor.

The following is a description of the preferred embodiment of the invention with respect to FIGS. 1-9. More specifically, FIG. 1 is a fragmentary composite drawing illustrating the improved vaneless rotary airlock valve, including one of the valve seats seat 10, along first and second planes, respectively parallel to and transverse to the axis of rotation 15 of the rotor 12. This composite cross section also corresponds to view line 2', of FIG. 2.

This drawing also illustrates the rotor 12 positioned such that the major axis 23 (FIG. 8) of the opening in the rotor 12 and the major axis 21 (FIG. 8) of the valve seat 10 coincide and are collectively illustrated at reference numeral 17. The vaneless rotary airlock valve is symmetric about the axis of rotation 15 and about the major axis 21 of the valve seats. Therefore, the views illustrated in FIG. 1 accurately illustrate all portions of the airlock valve comprising the invention.

Stated another way, the left portion of FIG. 1 illustrates a side view of a typical quarter of the vaneless rotary airlock valve in cross section, along a plane which is parallel to its axis of rotation 15. The right half of this drawing similarly illustrates in cross section a typical quarter of the vaneless airlock valve in a plane transverse to the axis of rotation 15, coincident with and parallel to the major axis 15 of the valve 10. Seating surface 13 mates with the outer surface of the rotor 12 and forms a seal therewith, as more specifically described below. A second identical seat mates with the opposite side of the rotor 12. These typical portions of the vaneless rotary air lock valve are separately illustrated in FIGS. 10 and 11 for additional clarity.

The inner and outer surfaces of the valve seat 10 are portions (sections) of spherical surfaces positioned concentrically about a common center 11. Construction of the valve seat 10 begins with the formation of a valve seat blank (not illustrated) consisting of a body composed of suitable material formed to include concentrically positioned inner and outer spherical surfaces extending over a solid angle of more than 180 degrees. A flat top surface 9 is made to coincide with a plane passing through the spherical surfaces. The major axis 21 of the valve seat 10 is perpendicular to this plane and also phases through the common center 11.

Geometrically, the seating surface 13 matches the outer cylindrical surface of the rotor 12, with the axis of rotation of the rotor 12 transverse to the major axis of the valve seat 10. Such a surface can be conveniently formed by machining the valve seat blank to form the sealing surface 13, either before or after the spherical inner and outer surfaces are formed. Other techniques may also be used to form the valve seat 10 and the sealing surface 13.

As will be appreciated by those skilled in the art, the flowthrough rate of the finished vaneless rotary airlock valve is a function of the rotor dimensions and the rate at which the rotor 12 is turned. Thus design of the rotor 12 begins with the selection of a rotor 12 having a inner radius R3 and an outer radius R4 suitable for the intended use. Also, as will be appreciated by those skilled in the art, the width of the opening in the rotor 12 must span an angle of 45 degrees or less in the plane transverse to the axis of rotation 15 of the rotor 12, in order for the vaneless rotary airlock valve to seal. The maximum width of the opening in the rotor in the plane parallel to the axis of rotation of the rotor 12 is selected to maintain a high angle between the outer surface of the rotor 12 and the inner spherical surface of the valve seat 10. Stated another way, as the length of R1 increases, the dimensions of the opening in the rotor 12 in a direction parallel to the axis of rotation 15 also increases. However, the angle between the outer surface of the rotor and the inner surface of the valve seat 10 changes and departs from the most favorable angle, in the range of 90 degrees, illustrated in FIG. 1. These design considerations dictate that the inner radius of the valve seat should be reasonably close to the outer diameter of the rotor 12.

To assure that the vaneless rotary airlock valve fully opens, the inner surface of the valve seat 10, determined by R1, is selected such that when the major axis 23 (FIG. 8) of the seating surface 1 coincides with the major axis 23 (FIG. 8) of the opening in the rotor 12, the inner perimeter of the seating surface 13 coincides with the perimeter of the opening in the rotor 12 along its shorter diameter, that is in a plane transverse to the axis of rotation 15. Stated another way, the inner perimeter of the seating surface 13, along its shorter diameter, must span an angle equal to the angle of the opening in rotor 12. This angle, in turn, must not exceed 45 degrees. This result is graphically achieved by selecting the origin of radius R1 such that the inner perimeter of the seating surface 13 coincides with the perimeter of the opening in the rotor 12 in a plane perpendicular to the axis of rotation 15 and passing through the major axis 23 of the opening in the rotor 12, when the rotor 12 is positioned as illustrated in FIG. 1. Since the inner perimeter of the seating surface 13 and the perimeter of the opening in the rotor must have the relationship previously described, the maximum width of the opening in the rotor 12 in a plane parallel to the axis of rotation 15 and to the major axis 23 of the opening in the rotor 12 is also defined when R1 is selected. This result is also graphically illustrated in FIG. 1.

As previously explained, radius R1 and radius R2 are selected to have a common center 11. After the common center 11 and value of R1 have been selected as described above, R2 is selected to correspond to the perpendicular distance between the common center 11 and the axis or rotation 15 of the rotor 12. This results in a reasonable width for the seating surface 13 and produces a smooth operating vaneless airlock valve. Other values for R2 may be used. However, some values of R2 may result in the sealing surface being undesirably wide or narrow.

The above discussion illustrates the geometric technique used to match the inner perimeter of the seating surface 13 to the opening in the rotor 12. Based on this geometric technique, the opening in the rotor 12 is machined using a numerically programmed machine to match the inner perimeter of the sealing surface 13 for all other points around the opening's perimeter in the rotor 12.

Additionally, FIG. 1 illustrates the housing 14 used to support the components of the vaneless rotary airlock valve as well as the retaining ring 16 and the pressurizing member 18. These components are identical to and are more specifically described in copending U.S. patent application Ser. No. 07/509,633. This copending patent application is incorporated by reference. Components of the vaneless rotary airlock valve comprising the invention can be constructed using the same materials discussed in this copending application, except as otherwise noted below.

Figure 2:
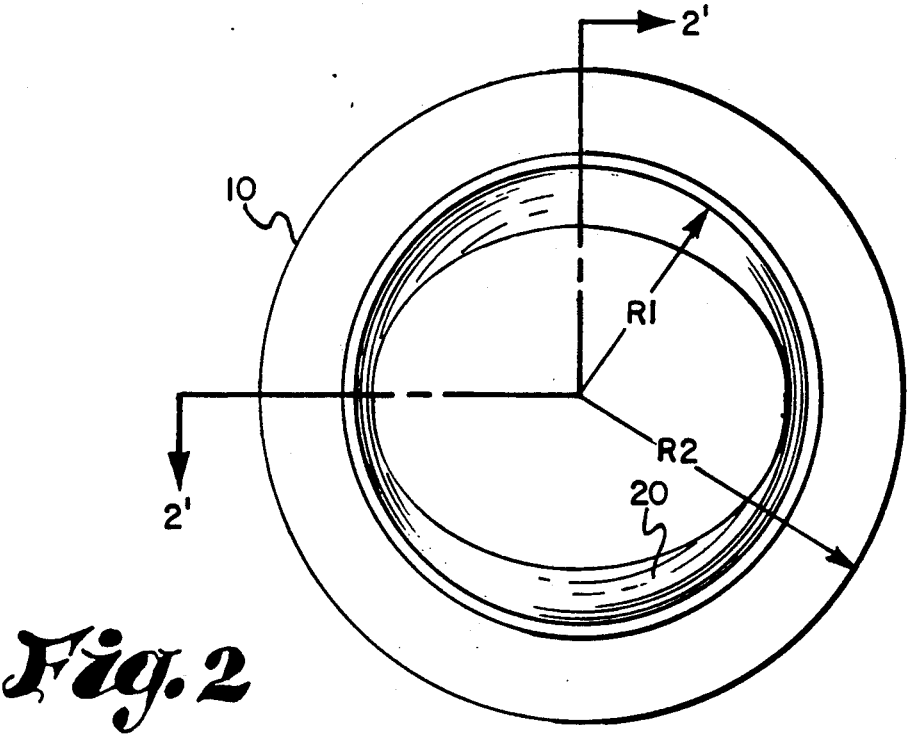
FIG. 2 is the top view drawing of a valve seat utilized in the invention.

FIG. 2 is a drawing illustrating the valve seat 10 in top view. This figure illustrates the inner spherical surface having a radius R1 as well as the inner perimeter 20, which is generally oval shaped in the top view. This inner perimeter 20 will also be discussed with reference to the opening in the rotor 12 later.

Figure 3:
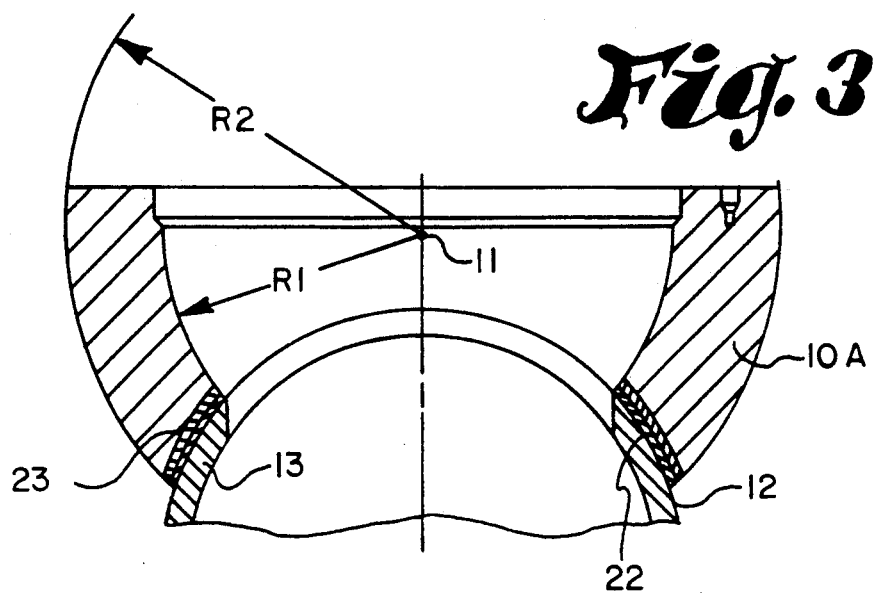
FIG. 3 is a cross-sectional view drawing of an alternate embodiment of the valve seat which utilizes a valve seat insert.
Figure 4:
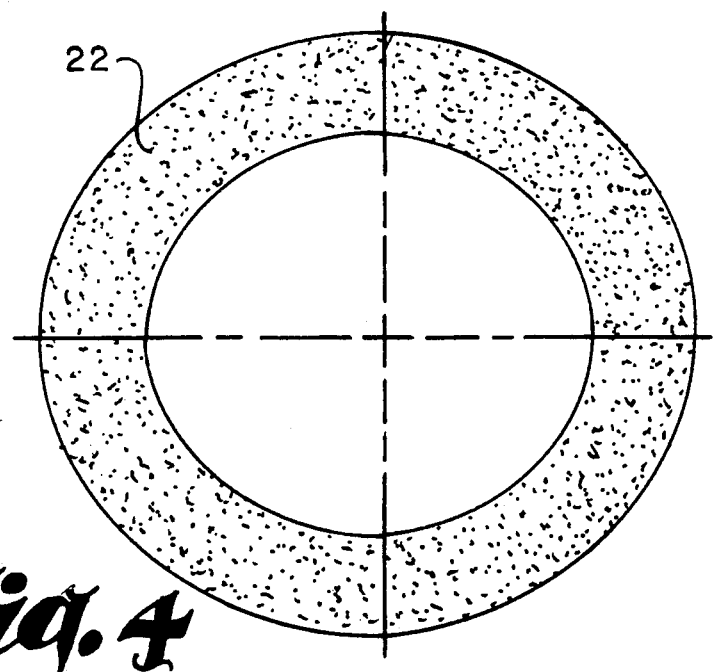
FIG. 4 is a top view drawing of the valve seat insert.
Figure 5:
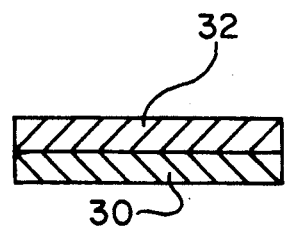
FIG. 5 is a drawing illustrating the valve seat insert in crossection.

An alternate embodiment of the valve seat includes a valve body 10A and a valve seat 22 as illustrated in FIG. 3 with reference to a plane transverse to the axis of rotation 15 of the rotor 12. In this embodiment, the valve seat is essentially identical to the valve seat 10 illustrated in FIG. 1 except that the modified valve seat includes a composite valve seat member 22 affixed to the valve body 10A by suitable attachment means, preferably by adhesive bonding.

In the embodiment illustrated in FIG. 3, R1 and R2 are selected as described above with reference to FIG. 1. However, the surface 23 must have a radius sufficiently (??) to permit the valve seat member 22 to be positioned and affixed to the valve body 10A.

Preferably, the valve seat member 22 is formed of material having sufficient flexibility to permit the valve seat member 22 to be constructed from flat sheet material. When so formed, the valve seat member 22 generally includes concentric inner and outer perimeters (which are elipises in the illustrated embodiment) in the and at least 2 layers, illustrated in top view in FIG. 4 and in cross section in FIG. 5. Valve seat member 22 typically does not exceed 0.25 inches thick and may be formed by stamping a suitable multi-layer laminated material. Specifically, valve seat member 22 includes an inner layer 30 comprising a material selected to form a suitable seal with the rotor 12, and the second layer 32 comprising a resilient material, such as rubber. In this embodiment, the resilient layer 32 provides an expansion means aiding in even loading of the seating surface 13 against the surface of the rotor 12 as well as compensation for thermal expansion of components of the vaneless rotary air lock valve. Additionally, the valve seat 10 may be rebuilt by replacing the valve seat member 22. Suitable material for the valve seat member are commercially available under the Trademark SULIDUR RB-85. Other laminated (two layer) materials include: a.PTFE (TEFLON) and an epoxy adhesive, and b.rubber backed UHMW-polyethylene.

In some embodiments apoxy type adhesive may also serve as the resilient layer and provide temperature compensation.

After suitable base material has been stamped to form the valve seat member 22, the valve seat member is conformed to the surface of the rotor and affixed to the body of the valve seat 10.

Figure 6:
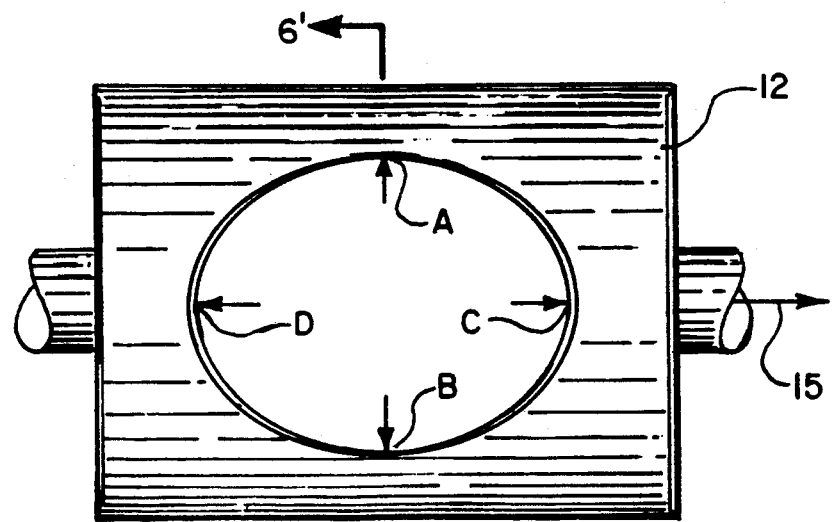
FIG. 6 is a drawing illustrating the rotor.
Figure 7:
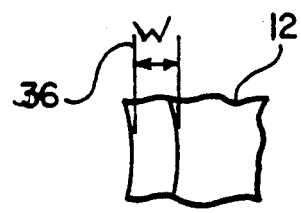
FIG. 7 is a drawing illustrating an enlarged fragment of the rotor including the chamfer of the outer perimeter of the rotor opening.

FIG. 6 illustrates a top view of the complete rotor 12. In this view the opening in the rotor 12 is also generally oval in shape, is symmetric about the major axis of the opening in the rotor 12, and is selectively chamfered. The illustrated oval configuration of the opening is necessary to match the oval configuration of the opening in the valve 10, as previously discussed with reference to FIG. 2.

In forming the chamfer no material is removed from the rotor 12 at first and second opposed positions, A and B, where the perimeter of the opening in the rotor 12 is maximally disposed from the major axis 23 of the opening in the rotor 12 in a plane transverse to the axis of rotation 15. The degree of the chamfer continually increases to a chamfer having a width "W," illustrated in the fragmentary enlarged portion of the rotor 12 in FIG. 7, at third and fourth positions, D and, where the perimeter of the opening in the rotor 12 is maximally disposed from the axis 23 in a plane parallel to the axis of rotation 15. It has been found that this chamfer synergistically cooperates with the valve seat 10 to significantly reduce the change in torque as the perimeter of the opening in the rotor 12 passes underneath the inner perimeter of the sealing surface 13. The details of the construction of this chamfer are subsequently discussed.

Figure 8:
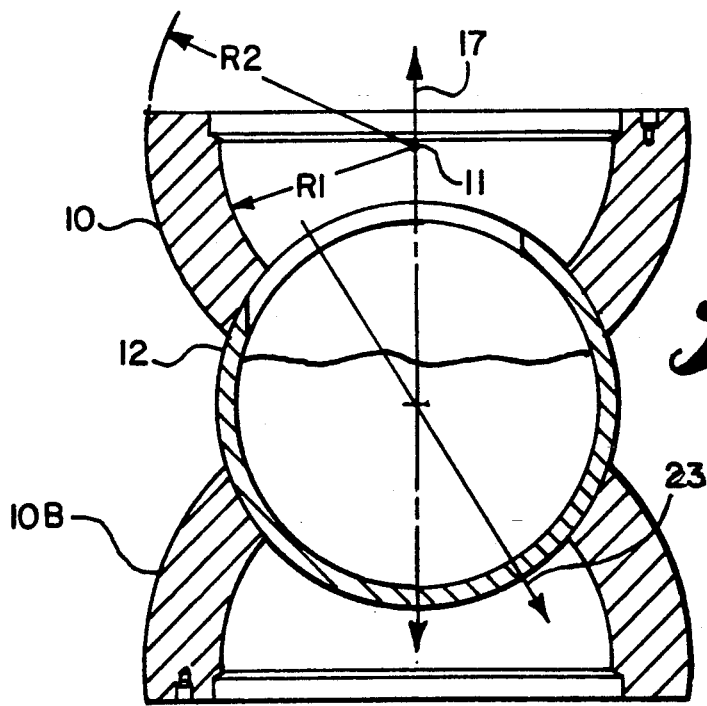
FIG. 8 is a drawing of the alternate valve seat and rotor positioned such that the major axis of the rotor is displaced from the major axis of the valve seat.

FIG. 8 is a cross-sectional view of the rotor 12 and the vaneless rotary airlock valve seat 10 transverse to the axis of rotation 15 of the rotor 12 and in a plane coincident with the major axis 23. This Figure clearly indicates that the valve seat 10 includes an inner spherical radius R1 and an outer spherical radius R2 with these two radii originating at the same origin 11. Also, in this drawing the rotor 12 is oriented at an angle to separately illustrate the major axis 21 of the opening in the valve seat 10 and the major axis 23 of the opening in the rotor 12 as contrasted to Figure (8) in which axis 21 and axis 23 are coincident and collectively illustrated.

Figure 9:
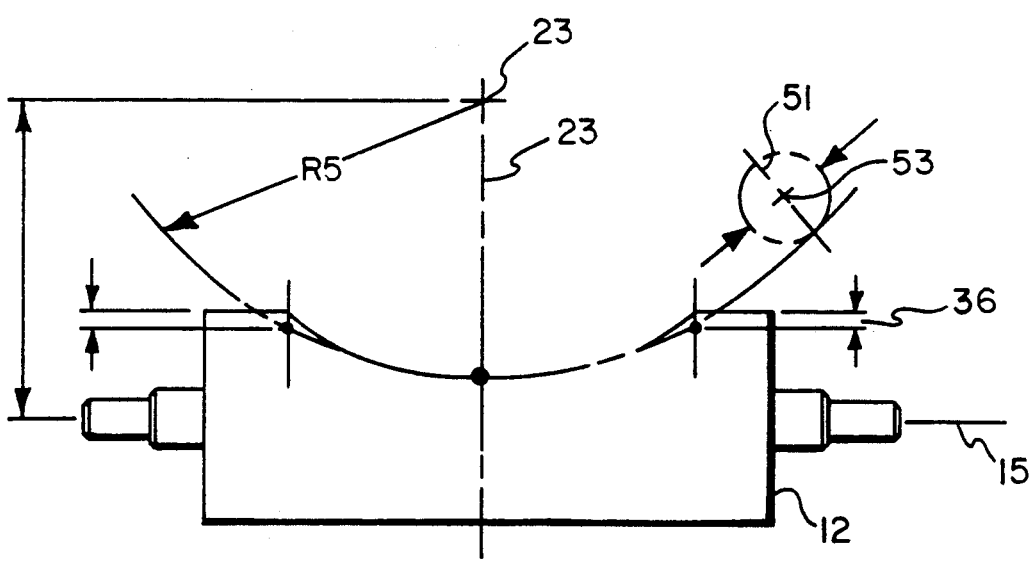
FIG. 9 is a drawing illustrating the machining technique used to chamfer the edges of the rotor opening.

FIG. 9 is a drawing illustrating the detail machining process for forming the chamfer extending around the perimeter of the opening in the rotor 12. The opening in the rotor 12, illustrated in FIG. 6, is formed by machining an appropriate opening such that the wall defining the inner perimeter of the opening is parallel to the major axis 23. This generally oval shaped opening is selected such that when the rotor is positioned as shown in FIG. 3, the inner perimeter of the wall corresponds precisely to the inner perimeter of the sealing surface 13. After the opening has been so machined, it is chamfered as illustrated in FIG. 9 using a suitable cylindrically rotating tool 51.

More specifically, the chamfer is formed by selecting a radius R5 beginning at a point of origin 50, which is on and parallel with the major axis 23 of the opening in the rotor 12. The cylindrically machining tool 51 rotates about an axis 53 which is perpendicular to the radius R5 such that R5 defines the path of the cutting surface of the tool 51. No material is removed from the perimeter of the opening when the center of rotation 53 of the tool 51 coincides with the major axis 23. The chamfer continuously increases and passes below the perimeter of the opening in the rotor 12 by a selected distance at the opposed ends of the opening in the rotor 12 as illustrated at reference numeral 36. Chamfering the inner perimeter of the rotor 12 in this fashion has also been found to be advantageous in that it further reduces bumping as the rotor passes underneath the sealing surface. The rotor is then rotated beneath a revolving slack belt sander which removes the sharp corners around the perimeter of the opening in the rotor.

I claim:

1. A vaneless air lock valve which includes a housing, a hollow rotor having an opening in its cylindrical outer surface, and first and second opposed valve seats each including spherical inner and outer surfaces, the radius of said inner surface and the radius of said outer surface having a common point of origin, and a sealing surface extending between said inner and said outer surface, said sealing surface also including inner and an outer perimeters, said sealing surface having a substantially constant width along all lines perpendicular to said inner and to said outer surface; said rotor being supported in said housing to rotate about its major axis, said valve seats also being supported by said housing such that said sealing surfaces of said valve seats engage said rotor such that in first and second rotary positions said opening is symmetrically positioned with respect to said sealing surfaces of said first and second seats with said inner perimeter of said valve seats substantially coinciding with said opening in said rotor.

2. A vaneless airlock valve in accordance with claim 1 wherein said valve seat comprises a valve body and a resilient valve seat affixed thereto such that at least one surface, of said resilient valve seat mates with said rotor to form said sealing surface.

3. A vaneless airlock valve in accordance with claim 2 wherein said resilient valve seat includes at least first and second layers.

4. A vaneless airlock valve in accordance with claim 3 wherein said first and second layers are respectively foam rubber and plastic.

5. A vaneless airlock valve in accordance with claim 4 wherein said coaxially positioned inner and outer surfaces are respectively spherical in shape.

6. A vaneless airlock valve in accordance with claim 5 wherein the inner perimeter of said sealing surface spans 45 degrees of said rotor in a plane perpendicular to the axis of rotation of said rotor.

7. A vaneless airlock valve in accordance with claim 6 wherein the width of said seating surface is substantially constant.

* * * * *